(12) United States Patent
Owensby

(10) Patent No.: US 7,690,549 B1
(45) Date of Patent: Apr. 6, 2010

(54) PURGE LINE FOR WELDING BACKUP

(76) Inventor: Howard S. Owensby, Rt. 1 P.O. Box 400, Fair Grove, MO (US) 65648

( * ) Notice: Subject to any disclaimer, the term of this patent is extended or adjusted under 35 U.S.C. 154(b) by 184 days.

(21) Appl. No.: 11/893,115

(22) Filed: Aug. 14, 2007

Related U.S. Application Data

(63) Continuation-in-part of application No. 10/985,349, filed on Nov. 10, 2004, now Pat. No. 7,410,087, which is a continuation-in-part of application No. 10/871,554, filed on Jun. 17, 2004, now abandoned.

(60) Provisional application No. 60/837,557, filed on Aug. 14, 2006, provisional application No. 60/479,548, filed on Jun. 18, 2003.

(51) Int. Cl.
 B23K 37/00 (2006.01)
 B23K 35/38 (2006.01)
(52) U.S. Cl. .............................. 228/42; 228/219; 219/74
(58) Field of Classification Search .................. None
 See application file for complete search history.

(56) References Cited

U.S. PATENT DOCUMENTS

| | | | |
|---|---|---|---|
| 478,024 A | 6/1892 | Rose | |
| 2,792,626 A | 5/1957 | Chyle | |
| 2,805,315 A * | 9/1957 | Chapman | 219/67 |
| 3,940,048 A | 2/1976 | Casey | 228/50 |
| 3,972,466 A | 8/1976 | Keith | 228/216 |
| 4,150,775 A | 4/1979 | Roden et al. | 228/50 |
| 4,182,951 A | 1/1980 | Kuder | 219/160 |
| 4,201,326 A | 5/1980 | Connell | 228/50 |
| 4,205,219 A | 5/1980 | Snell | 219/160 |
| 4,285,458 A | 8/1981 | Slavens | 228/49 B |
| 4,344,556 A | 8/1982 | Knapp | 228/50 |
| 4,363,951 A | 12/1982 | Shiga | 219/160 |
| 4,454,405 A * | 6/1984 | Riley | 219/61 |
| 4,682,724 A | 7/1987 | Hahn | 228/50 |
| 4,759,981 A * | 7/1988 | Weil | 428/343 |
| 5,110,031 A | 5/1992 | Rinaldi | 228/50 |
| 5,361,972 A | 11/1994 | Barker | 228/219 |
| 5,398,862 A | 3/1995 | Aleman | 228/49.3 |
| 5,425,492 A | 6/1995 | Thode | 228/102 |
| 5,603,358 A * | 2/1997 | Lepoutre | 138/149 |
| 5,669,547 A | 9/1997 | Spring | 228/219 |
| 5,981,897 A | 11/1999 | Offer et al. | 219/75 |
| 6,078,730 A * | 6/2000 | Huddart et al. | 392/480 |
| 6,119,916 A | 9/2000 | Anderson et al. | 228/44.5 |

(Continued)

FOREIGN PATENT DOCUMENTS

JP 09051961 A * 2/1997

(Continued)

*Primary Examiner*—Kiley Stoner
(74) *Attorney, Agent, or Firm*—Jonathan A. Bay

(57) ABSTRACT

A purge arrangement for welding backup of a seam between two surfaces selected for welding together along respective runs which define the seam includes a ventilated tubeform and an adhesive tape attached for forming a seal across the back of the seam and sealing in the ventilated tubeform. The ventilated tubeform adapted for flooding with a purge gas by a source thereof. The adhesive tape's seal across the back of the seam traps the flood of the purge gas in the interspace between the tape and seam and ultimately flushes the as-yet un-welded portions of the seam with the purge gas.

12 Claims, 2 Drawing Sheets

U.S. PATENT DOCUMENTS

| | | | |
|---|---|---|---|
| D478,024 S | 8/2003 | Nordstrom | D11/221 |
| 6,907,796 B2* | 6/2005 | Bremer et al. | 73/863.11 |
| 6,991,181 B2* | 1/2006 | Alexander et al. | 239/201 |
| 2002/0118984 A1* | 8/2002 | Lee et al. | 399/330 |
| 2003/0071108 A1* | 4/2003 | Reser et al. | 228/119 |
| 2003/0177695 A1* | 9/2003 | Manning | 47/48.5 |
| 2004/0046045 A1* | 3/2004 | Alexander et al. | 239/201 |
| 2007/0145038 A1* | 6/2007 | Vissa et al. | 219/535 |

FOREIGN PATENT DOCUMENTS

| | | | |
|---|---|---|---|
| JP | 409295147 A | * | 11/1997 |
| JP | 410029065 A | * | 2/1998 |

* cited by examiner

PURGE LINE FOR WELDING BACKUP

CROSS-REFERENCE TO RELATED APPLICATION(S)

This application claims the benefit of U.S. Provisional Application No. 60/837,557, filed Aug. 14, 2006.

In addition, this application is a continuation-in-part of U.S. patent application Ser. No. 10/985,349, filed Nov. 10, 2004, now U.S. Pat. No. 7,410,087 which is a continuation-in-part of U.S. patent application Ser. No. 10/871,554, filed Jun. 17, 2004, now abandoned, which claims the benefit of U.S. Provisional Application No. 60/479,548, filed Jun. 18, 2003.

All the foregoing disclosures are incorporated herein by this reference.

BACKGROUND AND SUMMARY OF THE INVENTION

The invention relates to welding backup systems for purge purposes and as especially advantageous for welding construction of creases with tanks and the like.

When for example and without limitation stainless steel is being welded, it is preferred it be done so in an atmosphere purged of oxygen. A suitable purging gas is nitrogen, for example. Some welding practices include inserting an entire assembly of the article-to-be welded in an oxygen-purged room or, on a reduced scale, glass chamber or case. What is needed is an improvement to flood a highly-pinpointed work area only with a purge gas in an otherwise breathable atmosphere for the workers.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
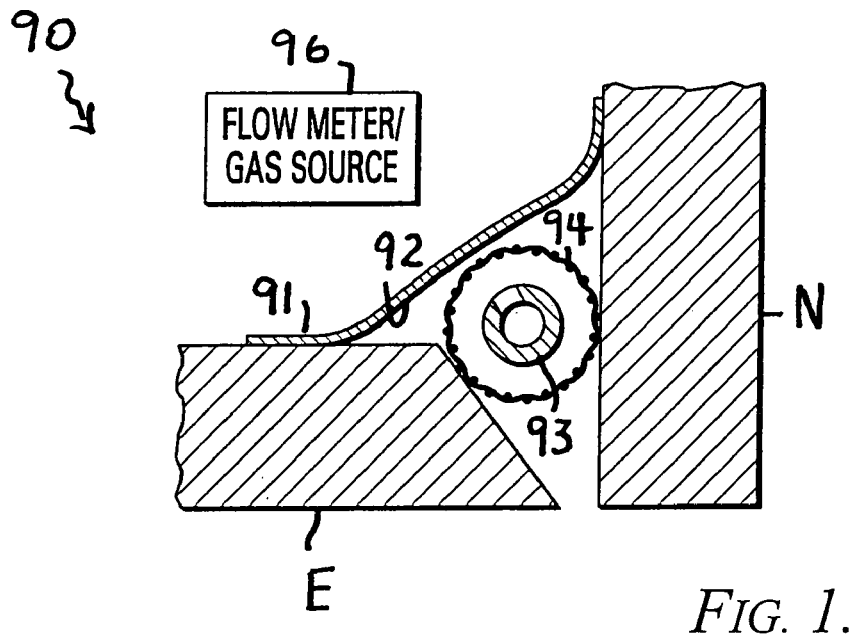
FIG. 1 is an elevational section view of a purge line in accordance with the invention as shown in an operative use environment.
Figure 2:
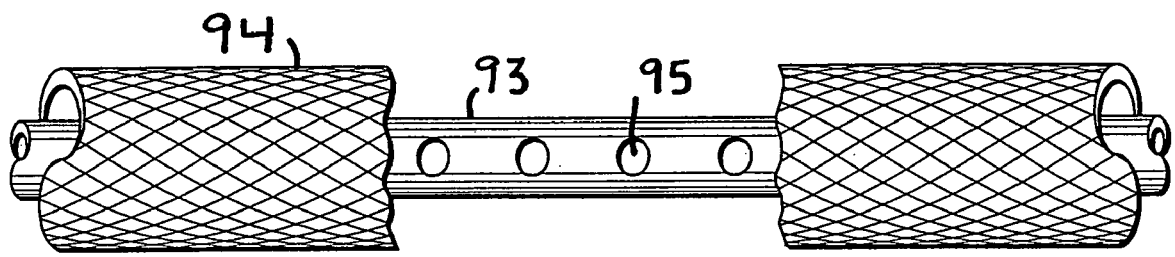
FIG. 2 is an enlarged scaled elevational view of an abbreviated run thereof—intermediate the indefinitely spaced away spaced ends thereof, which are broken away—wherein central portions of the covering sheath are removed from view in order to reveal the ventilated tube in the lumen thereof.

FIGS. 1 and 2 show one embodiment of a purge arrangement 90 in accordance with the invention, as for more particularly but without limitation achieving a purge arrangement 90 for both creases (as shown) and cylindrical seams (not shown) or the like. In FIG. 1, this crease may be typical of—and only as an example and without limitation—being formed between a nozzle N and end cap E. The crease can be serviced by purge arrangement 90 which comprises a seal of metallic tape 91 (aluminum is suitable) having an adhesive layer 92 for sealing in a ventilated tube 93 and its porous sheath 94. Preferably the ventilated tube 93 is formed of copper, and is perforated at regularly-spaced intervals with vents 95. Preferably the sheath 94 comprises a woven copper-filament flexible conduit. In use, the ventilated tube 93 is preferably serviced by a metered gas source 96.

This purge arrangement 90 can be readily adapted for uses other than besides with creases alone. That is, purge arrangement 90 can be satisfactorily strung around an inside diameter or an outside diameter to provide purge service welding a seam from the opposite side of the tank wall as the purge arrangement 90.

Figure 3:
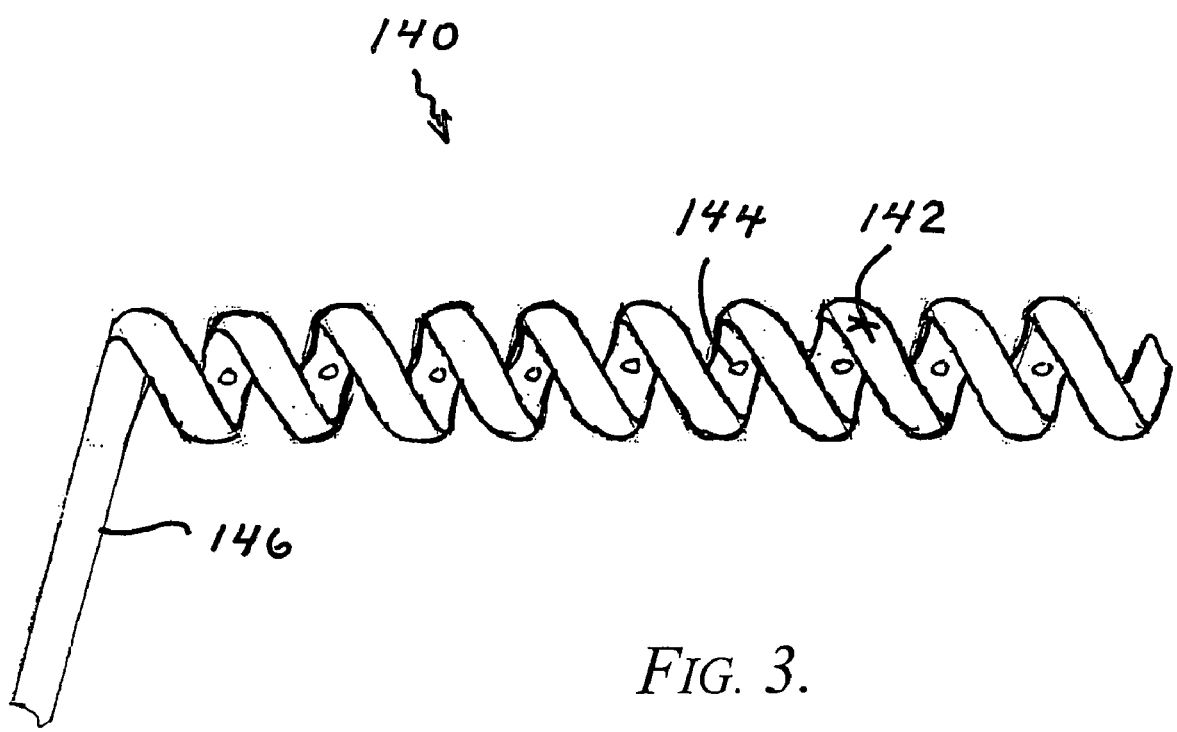
FIG. 3 is a side elevational view of an alternate embodiment of a purge line in accordance with the invention, showing one end and an abbreviated run thereof, and indefinitely spaced away from the other end thereof, which is broken away.

FIG. 3 shows an alternate embodiment of the invention, comprising a flexible coiled purge line 140. This flexible coiled purge line 140 shall be described next in relation to not only an example way of producing it but also its resultant advantages in use.

The flexible coiled purge line 140 is produced from soft copper tubing 142. Preferably the copper tubing 142 is straightened (none of the intermediate steps of the process are shown). Then an axial line is marked or otherwise reckoned on the outer surface copper tubing 142's sidewall (not depicted). That actual or virtual axial line (again, not illustrated) provides the alignment for locations of a regularly-spaced axial series of perforations 144 through the sidewall. The perforations 144 only extend to far as into the tubing 142's hollow core (ie., and not all the way through so as to pierce the diametrically-opposite point on the sidewall).

The perforated and (relatively) straightened tubing 142 is coiled in a helix approximately as shown in FIG. 3, about a lumen which, as depicted, is relatively axially-straight (ie., the lumen is the central cylindrical cavity which the helical coils circumscribe).

As said, the tubing 142 is coiled approximately as shown in FIG. 3. More preferred still is if the tubing 142 is coiled not with open coils as shown in FIG. 3 but with closed coils. That is, it is preferred if adjacent coils abut each other.

The tubing 142 is coiled such that the series of perforations 144 in the sidewall thereof (and along an axial line on the outer surface thereof) preferably wind-up all being oriented venting directly at the center of the lumen. The tubing 142's extreme ends preferably comprise short, straight end-terminations 146 (only one shown) for accepting tubing couplings and the like. The foregoing describes one non-limiting example way of the producing the flexible coiled purge line 140 in accordance with the invention.

In use, the flexible coiled purge line 140 in accordance with the invention provides some of the following advantages.

One advantage is, the flexible coiled purge line 140 is indeed flexible. It is flexible much like a slender spring having closed-coils. Such an example slender spring familiar to many might be the spring put to service for screen doors in older residential homes. That is, the spring which pulls shut the swinging screen door on the backdoor of the house. Thus, to any who are familiar with such springs, the flexible coiled purge line 140 is indeed flexible in about the same way.

Hence, the flexible coiled purge line 140, in the absence of any deformation forces, adopts a straight pose along a straight line. However, with the application of light pressure, a worker can easily wrap the spaced ends around (only one end shown in FIG. 3) to form the flexible coiled purge line 140 as a whole into a circle. That way, the flexible coiled purge line 140 can be wrapped around the outside of a cylindrical article, like a nozzle that gets welded to one of the spherical end-caps of a tank (see, eg., the first figure in the above-referenced priority application Ser. No. 10/985,349, filed Nov. 10, 2004).

Alternatively, the flexible coiled purge line 140 can be wrapped in a circle as before but disposed not one the outside but inside a cylindrical article, such as a pipe or tank sidewall.

Following use, when the deforming force is removed, the flexible coiled purge line 140 restores itself to more or less straightened along a straight line. It thereafter is ready for a subsequent use.

One preferred embodiment of the invention has the flexible coiled purge line 140 produced out of ³⁄₁₆-inch O.D. (~5 mm O.D.) soft copper tubing 142 that is coiled around a ⅜-inch O.D. (~13 mm) mandrel. Another preferred embodiment has the flexible coiled purge line 140 produced out of ³⁄₁₆-inch O.D. (~5 mm O.D.) soft copper tubing 142 that is coiled around a ½-inch O.D. (~13 mm) mandrel. Designers ordinarily skilled in the art can readily produce the inventive flexible coiled purge line 140 according to other aspect ratios of tubing O.D. to mandrel O.D.

The inventive flexible coiled purge line 140 can be produced in varying lengths as well. A four foot (~1.2 m) long version can readily wrap around in hoops of varying diameter ranging from ½-foot (~15 cm) O.D. to one foot (~30 cm) O.D. Perhaps tighter hoops can be wrapped but there is a critical-minimum wrap-diameter for each aspect ratio of tubing diameter to helix's lumen diameter at which the inventive flexible coiled purge line 140 will be permanently damaged. On the brighter side, any wrap diameter in excess of the critical minimum is readily doable with the inventive flexible coiled purge line 140. If for example, a four foot (~1.2 m) long version is put into service to wrap a ½-foot (~15 cm) O.D. hoop, excess end margins of the inventive flexible coiled purge line 140 are simply overlapped. Conversely, if the hoop diameter measures two feet (~60 cm), the two units of four foot (~1.2 m) long purge line shall have to be arranged end-to-end, with still some overlap at the extreme end margins.

Another design advantage of the inventive flexible coiled purge line 140 is that the perforations 144 wind up all aiming into the lumen of the helix. That way, the first pinpoint locality that the injected purge gas floods and purges of oxygen is the lumen of the helix. If the perforation were arranged otherwise, oxygen could conceivably escape being purged or be trapped inside the lumen, but probably only temporarily. However, it is problematical to not know when or where all the oxygen would be purged from the system. Conceivably, trapped oxygen might escape at the worst possible time and adversely impact the integrity of the weld. Therefore, in order to ensure the purging of oxygen not only in the localized space surrounding the helix of the purge line but also from the lumen, the perforations 144 are aimed at the center of the lumen.

It is a matter of design preference that all and not some of the perforations 144 aim into the center of the lumen.

Moreover, the purge gas vents from the lumen at the inter-coil gaps between adjacent coils. Hence when the flexible coiled purge line 140 is wrapped in a circle, the inter-coil gaps are wider along the outside of the bend, and thinner elsewhere. Nevertheless, if the flexible coiled purge line 140 is used to replace the ventilated-sheathed purge line 93,94 in the purge arrangement 90 of FIG. 1, the flexible coiled purge line 140 will nevertheless readily purge the pinpoint space between the nozzle N, end cap E, and tape 91.

Whereas the foregoing predominantly describes the flexible coiled purge line 140 being wrapped in circles, it again is indeed flexible. Accordingly, the flexible coiled purge line 140 can be utilized in endless non-straight configurations, including for example and without limitation oval or serpentine and so on.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A purge arrangement for welding backup of a seam between two surfaces selected for welding together along respective runs which define said seam; said purge arrangement comprising:
   a porous sheath;
   a ventilated tubeform inserted inside said porous sheath, said tubeform being provided with an axially-distributed plurality of vents and adapted for flooding with a purge gas by a source thereof in order to flood the interior of the porous sheath therewith in turn;
   adhesive tape attached for forming a seal across the back of said seam and sealing in said porous sheath as well as the ventilated tubeform inside thereof along the back of said seam whereby said porous sheath when flooded with the purge gas flushes the interspace between said tape and seam and ultimately flushes the as-yet un-welded portions of said seam with said purge gas.

2. The purge arrangement of claim 1 wherein said porous sheath comprises heat-conducting metal conduit.

3. The purge arrangement of claim 2 wherein said porous sheath comprises a woven copper-filament flexible conduit.

4. The purge arrangement of claim 2 wherein said ventilated tubeform comprises flexible, heat-conducting metal tubing and said porous sheath comprises flexible, heat-conducting metal conduit whereby said porous sheath as well as the ventilated tubeform inside thereof can be configured in various non-straight configurations, including oval or serpentine configurations as well as a full circle.

5. The purge arrangement of claim 4 wherein said ventilated tubeform comprises soft copper tubing.

6. The purge arrangement of claim 4 wherein said adhesive tape comprises a flexible, heat-conducting metallic film coated with an adhesive layer.

7. The purge arrangement of claim 6 wherein said metallic film comprises aluminum or copper.

8. A purge arrangement for welding backup of a seam between two surfaces selected for welding together along respective runs which define said seam; said purge arrangement comprising:
   a ventilated tubeform that has a hollow core and has a central span between spaced ends formed in helical coils around a central lumen for the helix thereof, said helically-coiled central span being provided with an axially-distributed plurality of vents whereby said ventilated tubeform is adapted for flooding with a purge gas by a source thereof; and
   adhesive tape attached for forming a seal across the back of said seam and sealing in said ventilated tubeform whereby purge gas flushes the interspace between said tape and seam and ultimately flushes the as-yet un-welded portions of said seam with said purge gas.

9. The purge arrangement of claim 8 said helically-coiled central span's coils and plurality of vents are cooperatively arranged to comprise the vents being oriented into the lumen of the helix whereby the purge gas vented by the vents floods and purges the lumen of the helix before thereafter the purge gas vents from the lumen at inter-coil gaps between adjacent coils.

10. The purge arrangement of claim 8 said ventilated tubeform is produced from a flexible material such that the helical coils thereof allow lumen-wise flexibility in the manner of a slender spring having closed-coils;

whereby in the absence of external deflection forces said helically-coiled central span adopts a relaxed pose along a line, while conversely in consequence of lightly-applied external deflection forces said helically-coiled central span is configurable in various off-line configurations including oval or serpentine configurations as well as a full circle.

11. The purge arrangement of claim 10 said ventilated tubeform is produced from soft copper tubing.

12. The purge arrangement of claim 8 wherein said adhesive tape comprises a flexible, heat-conducting metallic film coated with an adhesive layer.

\* \* \* \* \*